US009408051B2

(12) United States Patent
Finney et al.

(10) Patent No.: US 9,408,051 B2
(45) Date of Patent: Aug. 2, 2016

(54) CONTEXT-AWARE SOCIAL MEDIA DISASTER RESPONSE AND EMERGENCY MANAGEMENT

(71) Applicant: Avaya Inc., Basking Ridge, NJ (US)

(72) Inventors: Peter Finney, Stevenage (GB); Alberto Pasi, Nova Milanese (IT); David Skiba, Golden, CO (US); Reinhard P. Klemm, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 365 days.

(21) Appl. No.: 13/904,361

(22) Filed: May 29, 2013

(65) Prior Publication Data

US 2014/0359008 A1    Dec. 4, 2014

(51) Int. Cl.
| | |
|---|---|
| *G06F 15/16* | (2006.01) |
| *H04W 4/22* | (2009.01) |
| *G06Q 10/00* | (2012.01) |
| *H04W 4/20* | (2009.01) |
| *H04L 12/58* | (2006.01) |
| *H04L 12/26* | (2006.01) |

(52) U.S. Cl.
CPC .................. *H04W 4/22* (2013.01); *G06Q 10/00* (2013.01); *H04W 4/206* (2013.01); *H04L 43/04* (2013.01); *H04L 51/00* (2013.01); *H04L 51/22* (2013.01); *H04L 51/32* (2013.01)

(58) Field of Classification Search
CPC ......... H04L 43/04; H04L 51/00; H04L 51/22; H04L 51/24; H04L 51/32; H04W 4/22; H04W 4/206; G06Q 10/00
See application file for complete search history.

(56) References Cited

U.S. PATENT DOCUMENTS

| | | | |
|---|---|---|---|
| 7,181,764 B2* | 2/2007 | Zhu et al. ........................ 726/4 |
| 2004/0255122 A1* | 12/2004 | Ingerman et al. ............. 713/176 |
| 2006/0067250 A1* | 3/2006 | Boyer et al. ................... 370/260 |
| 2011/0125697 A1 | 5/2011 | Erhart et al. |
| 2011/0125793 A1 | 5/2011 | Erhart et al. |
| 2011/0125826 A1 | 5/2011 | Erhart et al. |
| 2011/0276513 A1 | 11/2011 | Erhart et al. |
| 2011/0288897 A1 | 11/2011 | Erhart et al. |
| 2012/0303659 A1 | 11/2012 | Erhart et al. |
| 2012/0315877 A1 | 12/2012 | Lewis |
| 2013/0311582 A1* | 11/2013 | Thai ............................. 709/206 |

OTHER PUBLICATIONS

Garlits, James D. "New Uses of Social Media and Emergency Technologies in Emergency Management," 14th Annual Federal Emergency Management Higher Education Conference, Jun. 6-9, 2011; 7 pages.
U.S. Appl. No. 13/591,049, filed Aug. 21, 2012, Klemm et al.

* cited by examiner

*Primary Examiner* — Krisna Lim
(74) *Attorney, Agent, or Firm* — Sheridan Ross P.C.

(57) ABSTRACT

Social media websites contain posts which may benefit persons affected by an emergency situation or natural disaster. Discovering trustworthy posters of useful information is disclosed such that messages indicating relevant information, and an associated trust value, may be provided to interested parties.

18 Claims, 5 Drawing Sheets

CONTEXT-AWARE SOCIAL MEDIA DISASTER RESPONSE AND EMERGENCY MANAGEMENT

FIELD OF THE DISCLOSURE

The present disclosure is generally directed toward social media and mechanisms for utilizing data obtained therefrom in connection with trust.

BACKGROUND

Social media websites, such as Twitter, YouTube and Facebook are popular social networks for individuals, companies and other organizations to exchange information. The information exchange via social media covers the entire spectrum of human interests.

Many social media websites, as well as other websites, currently allow for reviews and other comments to be provided by individuals. Privacy concerns and other issues generally prevent knowing detailed or reliable information about the poster of a review or comment. It is also possible that the publically available profile provided by the poster is blank, anonymous or deliberately misleading. The poster may be mimicking human activity but in fact be an automated robot, with an assumed biased party directing the robot. On the Internet, anybody can be anyone.

Whether or not a person is who they claim to be, their expertise in a particular area is undetermined even if they have expertise in another area. For example, a poster could provide a detailed and accurate review of a television set but also provide biased and inaccurate information in a post about a movie or book. It may be because the poster has expertise in one area and not another or it may be because the poster has tastes that a reader shares with respect to television sets but not with respect to movies and books. Whatever the reason, it is difficult to rely on on-line public postings for consistent, reliable and useful information, even if such information is in fact accurate and reliable. It would certainly be counterproductive to rely on the current art of on-line postings as a source of information during a disaster or other emergency situation.

SUMMARY

It is with respect to the above issues and other problems that the embodiments presented herein were contemplated. This disclosure provides, among other things, an automated mechanism for retrieving disaster information from a number of data sources and posters and then utilizing the information in a meaningful way. In particular, embodiments of the present disclosure propose to determine a trust level for data obtained from a social media feed, for example, and then basing one or more actions on the determined trust level.

Systems have been described that allow for mapping a person's identity to an alias on a social network site. In particular, U.S. Patent Publication No. 2012/0303659 to Erhart et al., the entire contents of which are hereby incorporated herein by reference, teaches the discovery of a known person via a social media alias and the association of that person with one or more topics.

Systems have been described that allow for tagging and notification of issues raised on a social media network site. U.S. application Ser. No. 13/591,049 to Klemm et al., the entire contents of which are hereby incorporated herein by reference, teaches the identification of a social media post relevant to an entity, determining if the post originator is an identifiable human being, and then creating an action tag to determine if the individual wishes to interact with the entity to enable a response to be sent.

Despite the inaccurate or deliberately misleading information, which may have the same appearance as accurate and reliable information, accurate and reliable information may be discovered on social media networks and made useful. The trick is sorting through the inaccurate and unreliable information to discern the accurate and potentially useful information. With the benefit of the incorporated references and the teachings herein, methods and systems may be provided to enable the detection of emergency situations and the determination of accurate information regarding the emergency and assistance to those affected and those responding. Such information may then be re-disseminated to affected and/or responding parties with a degree of confidence.

As emergency situations are varied in terms of scope, impact and response, so too are social media postings. Postings may ask questions as well as provide information on where assistance may be found to address particular issues of those affected. The scale of the emergency may be minor and highly localized (e.g., "a fender-bender at $1^{st}$ and Main") where a message to those in the area may be to simply avoid that intersection for the next hour. Other emergencies are of a larger scale, such as hurricanes, tsunamis, toxic or radioactive leaks, or any number of other human caused or natural events. The responses may be targeted to any one or more groups. For example, downed power lines or gas leaks may notify utility crews where to start their repair efforts. Individuals needing food or water may receive notification of such information. Even speculative information may prove useful, for example, a post wondering if a wheelchair bound individual need special assistance.

In one embodiment, a method for performance by an electronic device is disclosed. The method comprises, monitoring a social media network operable to receive a post from a source; determining that the post satisfies a criterion or set of criteria, upon determining that the post satisfies the criterion or set of criteria, determining a trust factor associated with a source of the post; and creating a notification in accord with the post and the trust factor.

In another embodiment, a computer system for sending a message is disclosed. The disclosed system comprises, a monitor, operable to monitor a social media website for a post; a processor, operable to obtain trust information associated with a poster of the post on at the social media website; wherein the processor is further operable to (a) determine the post satisfies a trust criterion or criteria, (b) determine the poster has a trust associated with the criterion and (c) format a message in accord with (a) and (b); and a reply interface, operable to send the message to a destination.

In another embodiment, another method is disclosed, comprising, determining a trend in posts by a number of posters on a number of sources; determining a trust level associated with the number of posters; determining a method to provide the trend to a recipient; determining the recipient and communicating the trend to the recipient in accord with the method.

However, the embodiments disclosed herein contemplate means by which valuable information may be discovered, evaluated, and disseminated in a manner that proves useful even as circumstances change. As a further embodiment, such information processing is suited towards detecting, evaluating and disseminating information regarding disasters or emergency situations.

The embodiments herein are directed towards idiomatic English as a matter of convenience only. Other languages, as well as, English and non-English slang, jargon, shorthand, colloquialisms or other language variations thereof are also contemplated by the embodiments herein.

The term "post," as used herein, means a comment, statement, opinion, question or other communication provided by individuals and organizations on a posting service and may further include any Web 2.0 comment (e.g., posts, blogs, websites, RSS feeds, comments, et cetera). A post may be an original composition or a forwarding or "reposting" of a post from another source, posting service or time.

The term "posting service," as used herein, means an Internet based information repository capable of receiving posts. Posting services include, but are not limited to, Facebook, Twitter, Google+, YouTube, LinkedIn, Pinterest and MySpace. Postings services may be publically or privately owned websites providing posting services as a secondary function. For example, a news outlet may provide a website with information, such as a Rich Site Summary ("RSS") feed, which may contain posts from the general public, authorized members of the public (e.g., account holders), or only individuals employed or authorized by the news outlet. Websites may also include web logs, or "blogs," and receive and display posts to the public, authorized members of the public, or only those authorized by the owner of the blog.

The term "poster," as used herein, means the individual or organization that created, posted or reposted a post.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Also, while the disclosure is described in terms of exemplary embodiments, it should be appreciated that individual aspects of the disclosure can be separately claimed. The present disclosure will be further understood from the drawings and the following detailed description. Although this description sets forth specific details, it is understood that certain embodiments of the disclosure may be practiced without these specific details. It is also understood that in some instances, well-known circuits, components and techniques have not been shown in detail in order to avoid obscuring the understanding of the invention The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
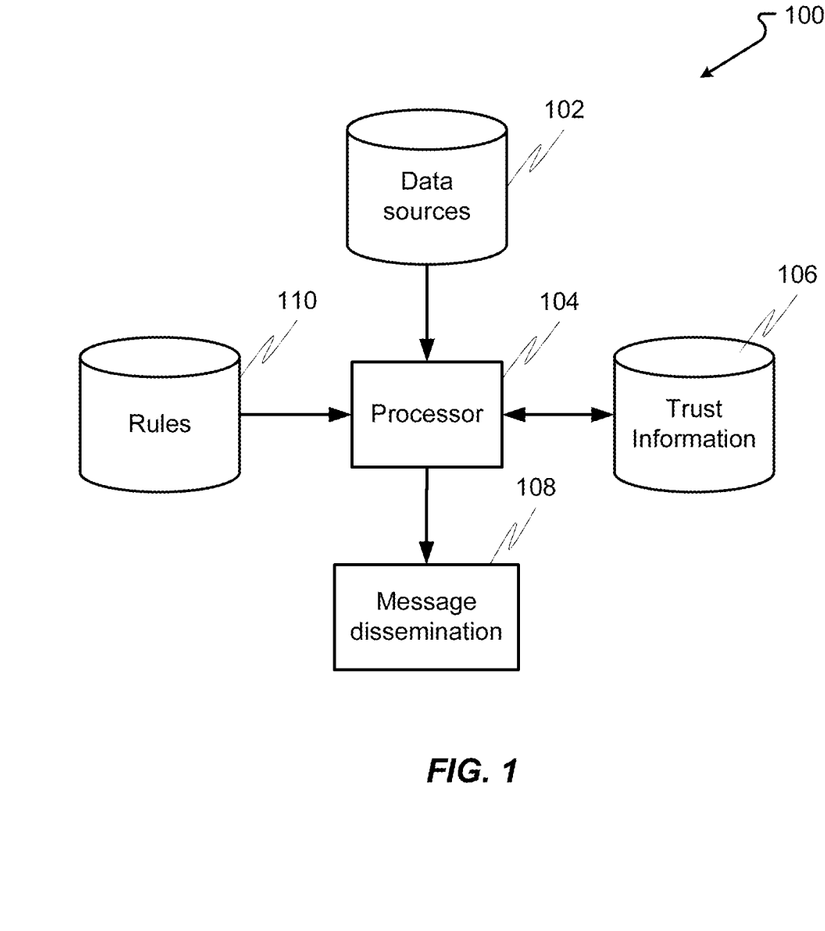
FIG. 1 is a block diagram illustrating a communications system in accord with embodiments of the present disclosure.

FIG. 1 shows block diagram which illustrates one embodiment of communications system 100 in accord with the embodiments of the present disclosure. In one embodiment, data sources 102 provide a number of information sources whereby posts may be found. Data sources 102 may be social media websites or networks, including but not limited to, Facebook, Twitter, Google Plus, YouTube, Spoke and LinkedIn. Additional data sources 102 include, but are not limited to RSS feeds, blogs, comments on websites and websites themselves. Processor 104 monitors data sources 102 for terms and/or phrases in accord with rules 110. The poster of posts, which include the terms of interest, are evaluated against trust information 106. Processor 104 evaluates the poster against trust information 106 and, if acceptable, causes message dissemination 108 to send a message representing the posts. In a further embodiment, message dissemination 108 sends a message that includes a trust factor, such as may be useful for the recipient of such a message may better decide if and how to act on the message.

In one embodiment, data sources 102 is at least one of a social media network, news outlet website, government or non-governmental agency website, educational institution, corporation, individual or other source of information. One or more constituent sources of data source 102 may include a number of posts from one or more posters.

Processor 104 may be embodied as a single processor on a single computer or multiple processors on a general purposes computer, dedicated computing platform, or distributed across multiple components of a computer network. The processor executing instructions embodied as machine executable instructions and/or circuitry. One set of instructions is provided with respect to the flowchart of FIG. 5.

In one embodiment, processor 104 retrieves posts from data sources 102. Rules database 110 provides instructions as to what posts to consider based on, but not limited to, keywords, source of the post, phrases, geographic location, time/date or other information, and known or suspected identity of the poster. In another embodiment, rules 110 may incorporate one or more secondary sources of information including, but not limited to, sources of weather, satellite, seismic, wave/tsunami, civil disturbances, traffic and utility data.

In another embodiment, one rule of rules database 110 is a volume and/or score of a set of information whereby processor 104 considers the volume and content of the posts as a factor in determining if the information is relevant and/or reliable or reliable enough. As can be appreciated, a large number of posts of the same, or nearly the same, information may be afforded a higher degree of reliability. However, posts may not always agree. For example, if two posts, both from an equally trustworthy sources, posts conflicting information, processor 104 may take one or more actions, including holding the information until more support is found one way or the other, causing message dissemination 108 to disseminate the information from both posts with appropriate reliability indicator and/or disseminate an aggregation of the information from both posts with additional information to help resolve the discrepancy. One type of additional information is the time of the post. As an example, at a first time a post may describe a location as having drinking water whereas a second post may state that same location does not have drinking water—both statements may have been true at their respective time of posting. In a further embodiment, a secondary review by human or automated agent may determine that conflicting posts represent an original and an updated post, as opposed to conflicting posts. To continue the example, if the second post indicates that it is an update, such as referring to the location as "just ran out of water," a higher degree of reliability may be provided over a post that simply fails to agree with at least one other post.

In other embodiments, the source of the post is considered. Trust information 106 stores, or stores access information (e.g., links, record addresses, et cetera), regarding the source of information and its trustworthiness. Trust information 106 may be a number of public or private sources of information and/or an aggregation thereof.

In one embodiment, trust information 106 is, and/or is derived from, a trusted source such as an employee database. The employer-owner of the information may have provided employee data to trust information 106 such as, for example, as part of a subscription to the services of communication system 100. As one example, the subscriber is a utility company responsible for water, electricity, natural gas and/or other utility services. Employee data is provided by the subscriber to communication system 100 including an alias of an employee used on a social network. As a result, posts by the alias are associated with by trust information 106 with a known identity of the poster and, therefore, may be afforded a different level of trust as compared to an anonymous poster.

As a further embodiment, the level of trust is further associated with a specific skill or role of the employee. Continuing the example above, the employer has provided roles of a number of employees for trust information 106 and one employee is a natural gas pipeline maintenance engineer. The engineer may have, for example, a Twitter account which is used to "Tweet" about any number of topics. However, a post by the engineer expressing concern, or lack of concern, for the smell of gas in a neighborhood may be given a higher degree of trust as compared to a bookkeeper for the same utility company or another member of the public. Similarly, that same pipeline maintenance engineer posting a message about public health matters, or other matters not otherwise known to be in the engineer's field of expertise, may be afforded a different level of trust. The level of trust may simply be a result of knowing who the poster is, or is not. For example, a post may be from an unknown poster. In one embodiment, all unknown posters may be considered unreliable. An employee record in trust information 106 for a poster may, at least, indicate the poster is an adult and has the faculties to maintain employment. Therefore, while the identity or expertise of the employee may not be provided, it would at least be known that the poster is not, for example, a child.

In yet another embodiment, processor 104 provides data to trust information 106. As a poster's credibility is determined, trust information 106 is updated. In one embodiment, trust information 106 is updated with respect to specific subject matter associated with the poster's posts. In another embodiment, trust information 106 is updated to reflect an overall trustworthiness of a poster.

Trust information 106 may be determined for a poster before a post is received, after a post is received or substantially concurrently as a post is received. Historical data about a poster may reveal the poster has, doesn't have, has acquired or has lost a certain expertise. In one embodiment, trustworthiness factors, positive or negative, may expire or be down-weighted over time, such as to help ensure a more accurate database of trust information 106 and account for changes in expertise over time. As one example, a poster may be an individual with an interest in a particular subject matter, for example, medicine. Their posts may often have been erroneous and/or misleading and, therefore, the poster associated with a low trust level. However, that same individual may later acquire skills, (e.g., attend nursing school, medical school, EMT training, et cetera) and become more trustworthy. In a second example, a poster may have expertise that expires or changes. One particular expertise would be with respect to events associated with a particular area. A poster who lives in the area may have demonstrated that their past posts have been reliable and accurate and, therefore, trustworthy. For example, post dealing with a river flooding, by an owner of riverfront property, may have been a particular trustworthy source of flood information in the past. However that same poster may have moved but continues posting flood information. The difference is that now, instead of posting first hand observations, the poster now posts flood information learned from other sources. As a result the once highly trusted poster of flood information may start to prove him or herself to be less accurate and/or timely and, accordingly, become associated with a decreased trust level.

In still yet another embodiment, trust information 106 may be obtained directly from data source 102, which may further include additional information, including but not limited to, date, time, geographic data, et cetera. As an example, a poster who known to live in one city but is travelling and has a number of recent posts dealing with another city may be afforded a higher degree of trust when commenting about an event that occurred in that city. Conversely, a poster who is known to be at one location, such as during travels, may be afforded a lower degree of trust when posting about a second location, even if that second location is otherwise known to be familiar to the poster, such as a home location.

Once processor 104 determines a message is to be disseminated, message dissemination 108 is operable to disseminate the message. In one embodiment, message dissemination 108 selects a channel of information. Certain messages may be suitable for posting back to one or more data sources 102, such as social media websites and the like. Subscribers or other parties may receive messages directly, such as by text message, email, automated or human voice calls, or social media network or other channels. In still other embodiments, the channel of communication is determined by the content of the message and/or by the subscriber. Messages with higher urgency or importance may be delivered by a high-priority channel whereas other messages are sent via a low-priority channel or not at all.

Processor 104 may disseminate the message by creating or updating a record in a database. In another embodiment, the message is provided by updating the context of a message. For example, messages may be presented in order of trust and placing, or moving, a message in the list provides an indication of trust.

Figure 2:
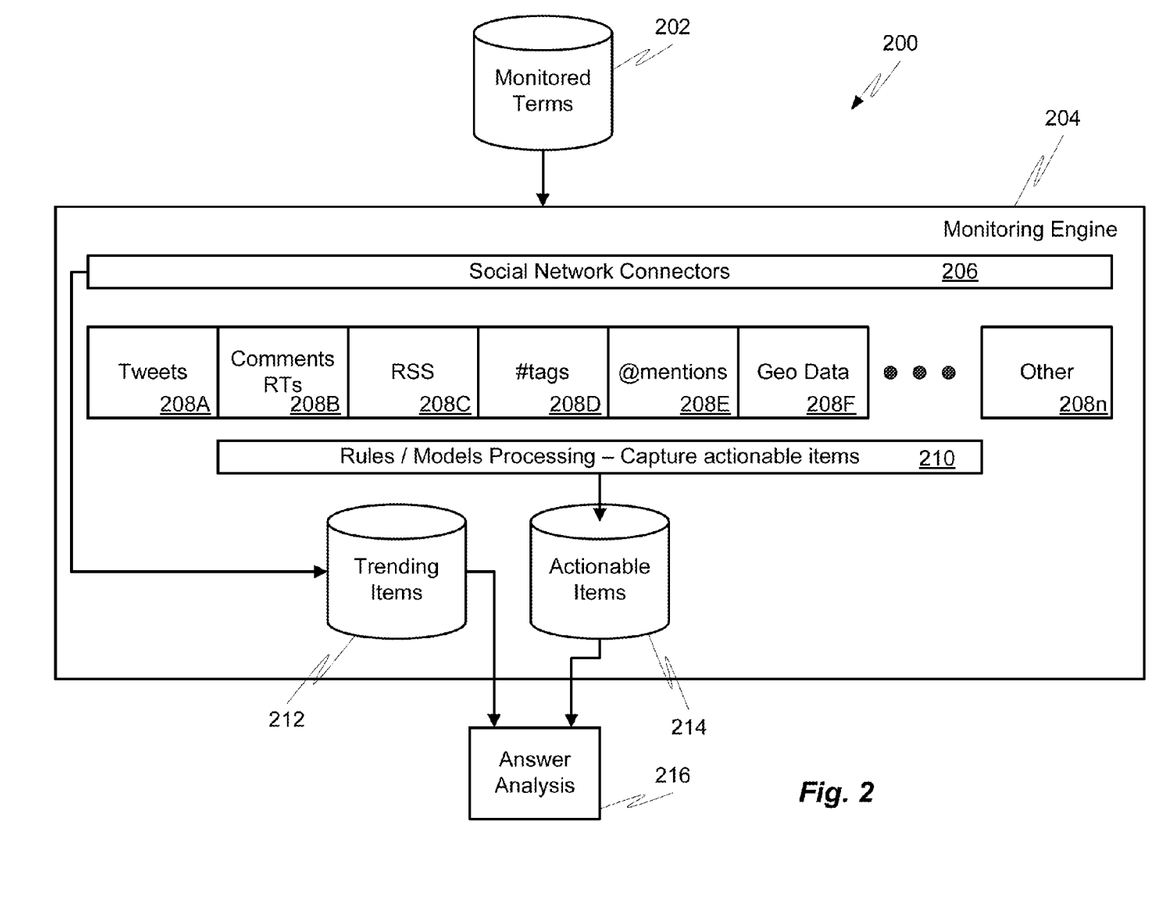
FIG. 2 is a second block diagram illustrating the communications system components in accord with embodiments of the present disclosure.

FIG. 2 is a second block diagram illustrating communications system components 200 in accord with embodiments of the present disclosure. Monitored term database 202 contains a repository of monitored terms, and may also include phrases, translations and/or other descriptors of text that can be analyzed by processor 104. Monitoring engine 204, which may be executed on processor 104, utilizes monitored terms 202 to identify posts containing subject matter of interest.

Monitor engine 204 includes social network connectors 206, including but not limited to, APIs, readers or other means to obtain information from social networks and websites. Meta data 208 is provided to various social connectors 206 to, alone or with the text of the post, identify context, trends and/or other meaning Meta data 208 may include tweets 208A, comments and re-Tweets ("RTs") 208B, RSS feeds 208C, hash tags 208D, "at" mentions 208E, geo-data 208F and other information available from time to time, and may include but is not limited to, seismic, weather, satellite, wave, water quality, and so on.

Trending items 212, in one embodiment, retains a time-based listing of terms such that a spike or other trend may be recognized as a potential event. Rules processor 210 applies a number of rules, models, simulations, or other determinate processes to capture actionable items. Answer analysis 216 determines if a response message will be made and, if so, how and/or to whom will the response message be disseminated.

As can be appreciated, monitored terms 202, social network connectors 206, rules processing 210, trending 212 and actionable items 214 are variously embodied. Human experts, artificial intelligence, computer learning and other means may be employed to set and/or modify monitored terms 202 and rules, such as those employed by trending items 212, actionable items 214 and answer analysis 216 (more fully described with respect to FIG. 3).

Figure 3:
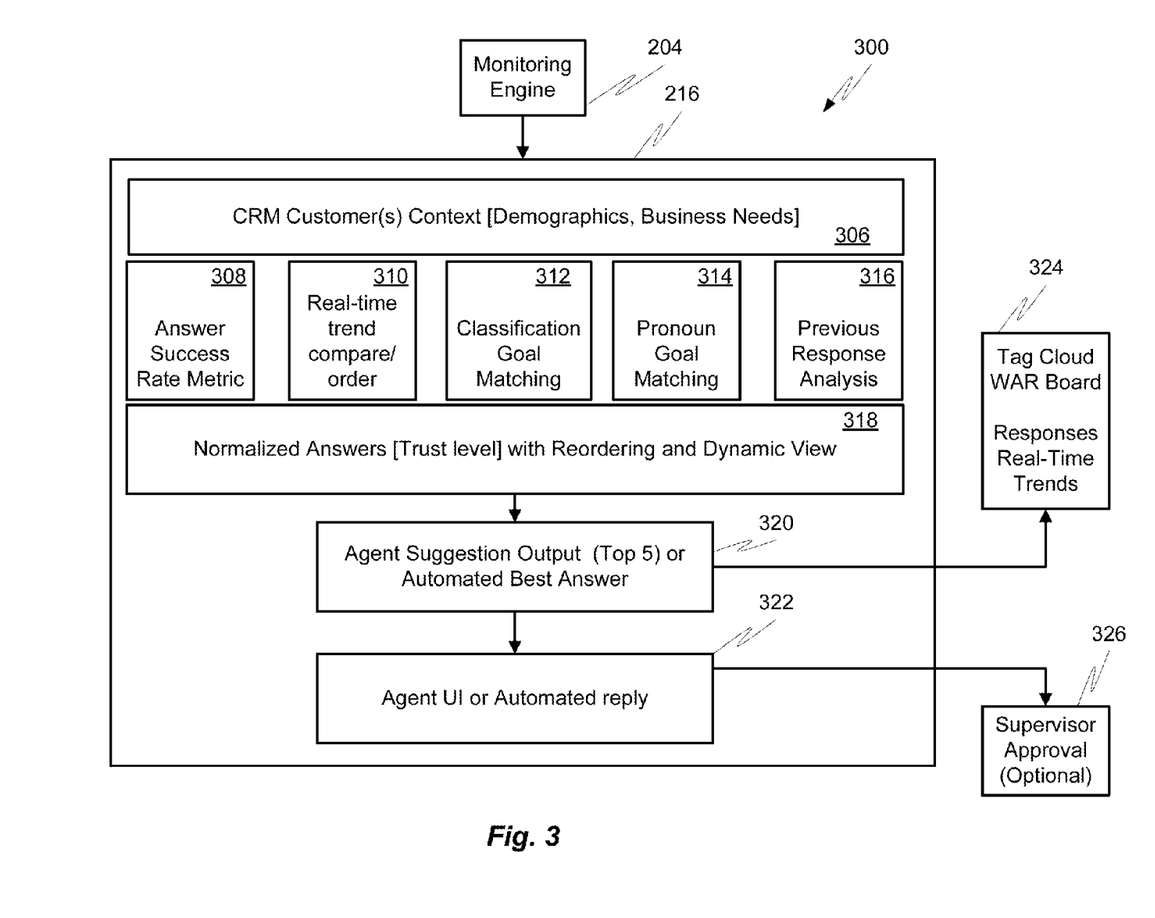
FIG. 3 is a third block diagram illustrating the communications system components in accord with embodiments of the present disclosure.

FIG. 3 is a third block diagram illustrating additional communications system components 300 in accord with embodiments of the present disclosure. In one embodiment, monitoring engine 204 indicates a message should be created. Answer analysis 216 provides additional processing and optionally submits the message to supervisor 326 for approval. If a message is to be sent, reply 322 sends the message. In another embodiment, answer analysis 216, via agent suggestion or automated best answer 320, provides data, summary data, response times and/or other status messages to summary 324. Summary 324 may include a tag clouds, WAR board, real time analytics or other display and/or analysis of trends.

Returning to the processing of answer analysis 216, the message to be sent may be determined, in part, by the recipient's needs. CRM data 306 provides rules for messages sent to a particular recipient, such as a subscriber. As an example, CRM data 306 may have information that one subscriber, such as a utility company, is interested in issues such as power outages and gas leaks and not interested in messages dealing with an outbreak of a disease. Another subscriber, such as a school, hospital or medical personnel, may choose to only get disease information.

In another embodiment, CRM data 306 may provide top issues list for a subscriber. For example, a hospital subscriber may have identified a number of issues that require the most attention or benefit the most from having advance notice. Topics not on the top issues lists, may then not trigger messages and be handled in the ordinary course of business. CRM data 306 may include other information such as demographics and business needs such that an issue impacting one segment of a population may trigger a message whereas the same message, but impacting a second segment of the population, may not. As one example, messages dealing with floodwaters may have a low threshold of concern when associated with a demographic known to be within a low-lying area. The same issue, but associated with a demographic known to not be within a low-lying area, may require a much greater sense of urgency or may be excluded from triggering a message entirely.

In another embodiment, CRM data 306 may be provided for a segment of the population or the general public as best determined by another party. For example, in times of a widespread disaster where drinking water is no longer available, another party may create a customer, such as those impacted by the disaster. In another embodiment, the customer is the general public and reply 322 creates a posting, Tweet or other message available to anyone to has Internet access and chooses to access the message Additional components 308, 310, 312, 314, and 316 of communication system 300 may provide input into the decision to send or not send a particular message, veto the sending of a message, or override a veto of one or more other additional components 308, 310, 312, 314, and 316. In another embodiment, additional components 308, 310, 312, 314, and 316 may score a particular message and an algorithm executed to determine if the message will, or will not, be sent. In a yet further embodiment, the algorithm determines the trust factor to be included in the message.

In one embodiment, answer success metric 308 is disclosed. Answer success metric 308 provides a repository of historical hits and/or misses and the degree of accuracy, timeliness, recipient match and/or other message success metric. In one embodiment, answer success rate metric 308 determines, alone or in part, the trust indicator associated with a message sent by reply 322. As one example, if it is known that message addressing power outages have produced poor results and therefore, answer success rate metric 308 may indicate the reliability of the message be low or, at least, lowered. In another embodiment, past successes or failures may determine, in whole or in part, if a message will be sent at all. As a benefit of answer success metric 308, strengths and weaknesses of messages may be determined and improvement activities directed accordingly.

In another embodiment, real-time trend compare/order 310 is disclosed. In one embodiment, real-time trend compare/order 310 examines meta data, such as tag clouds (e.g., #nowater, #nopower, #poweroutage, et cetera) and alone, or optionally with secondary information, determines if a message should be sent. Secondary information is information that can be derived from a source, the post being one source, to assist in determining a trend. Examples of secondary information include, but are not limited to, geo-location data associated with a post, time and/or date of the post, poster, and source of the post. As one example, a disaster occurs and posts indicating a need for food or water may begin to trend. However, if a significant portion of those posts are indicating a need for food but are originating from outside of the affected area, the trend may indicate the need to not send, or delay sending, a message. As a further option, real-time trend compare/order 310 may work in concert with trust information 106 to send a message but indicate the trustworthiness appropriately.

Real-time trend compare/order 310 may also be used in concert with predictable trends, such as the categories of needs that follow a major disaster like a hurricane or earthquake. As an example, trends for a hurricane may begin with evacuation requests for those with limited ability to evacuate themselves, protective resources (e.g., plywood and tarpaulins), supplies (e.g., groceries and medicines). Then, as the storm begins, trends may reflect issues associated with flooding and wind damage, such as a second wave of evacuation requests from those who took a position to ride out the storm but now find their position untenable. As the storm subsides, trends may indicate immediate emergencies such as medical attention, rescue or missing persons. As the immediate danger from the storm further subsides, trends may be expected addressing a need for food, water, and shelter and inquiring into the wellbeing of affected persons. For more long-lived events, the trends may extend to sanitation, disease control, recovery and rebuilding activities.

For predictable trends, secondary information may be used to refine a trend. One example of secondary information of a trend is where, when, who and how many are affected by a trend. For example, an earthquake of a significant magnitude in an area is expected to produce a trend indicating ruptured water lines and the need for drinking water. While seeing the trend develop, which may be more, less or the same as predicted may be useful. It may also be useful to know when and where the events are occurring as well as who is affected. Having knowledge, such as where leaks are first seen, largest, ongoing, and so forth may provide utility companies with information to triage their efforts to stop leaks and preserve as much water as possible. Knowing that a community of homebound people, versus the population in general, is without water may also be important secondary information. While some trends may be predicted, others may not. For example, an earthquake of a given magnitude may not be expected to produce a trend indicating landslides. However, if a trend indicating landslides is observed by real-time trend compare/order 310, a message may be generated.

In another embodiment, classification goal matching 312 is disclosed. Classification goal matching 312 provides an indication as to the category or topic of a number of posts. For example, a hundred recent posts included some reference to locating food. Classification goal matching 312 may then determine that there is an emergency and the type of emergency is lack of food.

In another embodiment, pronoun goal matching 314 is provided. Pronoun goal matching 314 indicates the subject of a post. For example, the singular, "I need water," is different from the plural, "we need water." Another example is that an observer may state, "They need water." While all refer to a common need, the pronoun provides additional information to aid in the formation of the response message.

In another embodiment, previous response analysis 316 is provided. Saturating a subscriber with messages may be counterproductive. However, a few of the same messages may be beneficial, such as during times of low activity. Previous response analysis 316 balances the volume of information versus type such that, as an example, subscribers responding to an emergency are not inundated with trivial information or information they cannot act upon. In another embodiment, previous response analysis 316 may escalate certain messages. For example, a utility company may be interested in receiving individual power outage messages only during times of low activity, however, during a major disaster such messages may be restricted or entirely curtailed. However, a power outage associated with a relief activity, such as a first aid station set up in a school, may justify a message that would be otherwise excluded if no such efforts were taking place at the same school. Normalized answers 318 provide formatting, ordering, prioritization, and/or other message processing such as may ensure the message is clear to the intended recipient.

As a benefit of one or more of the foregoing, the subscriber may triage their disaster response activity.

Figure 4:
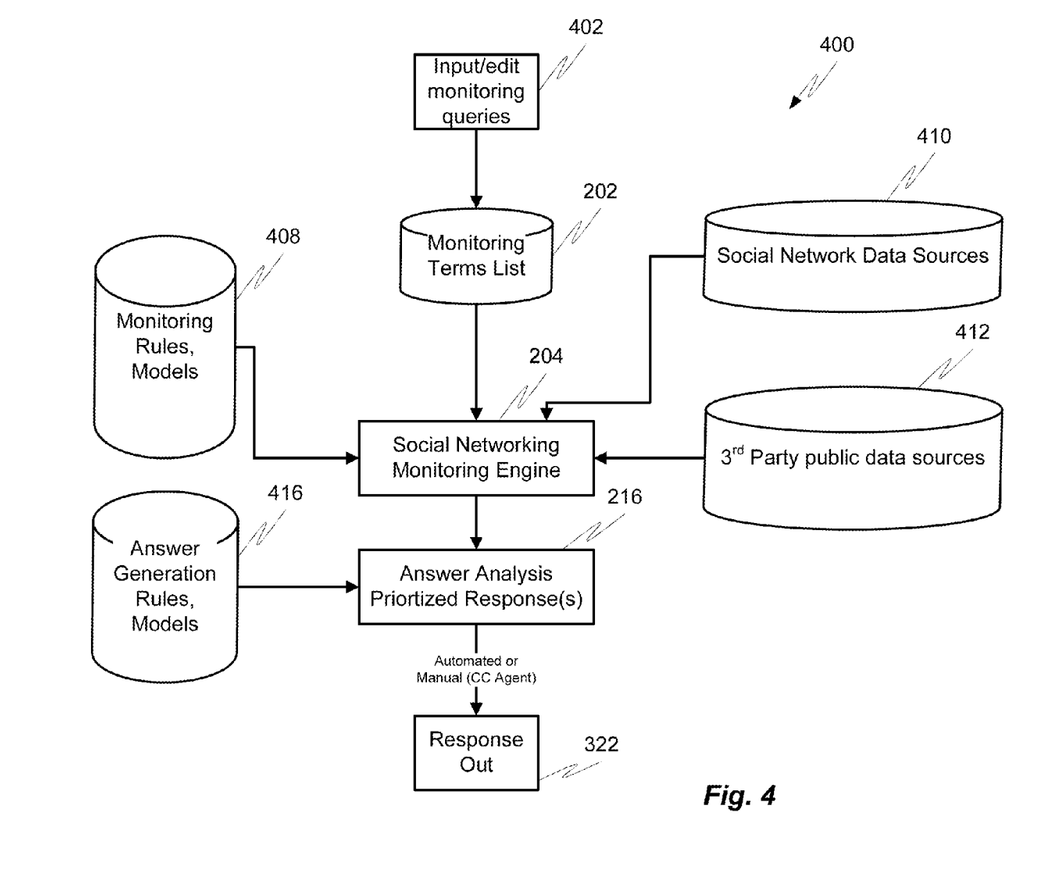
FIG. 4 is a fourth block diagram illustrating the communications system components in accord with embodiments of the present disclosure.

FIG. 4 is a fourth block diagram illustrating the communications system components 400 in accord with embodiments of the present disclosure. In one embodiment, monitoring queries 402 are created and input to provide the words, phrases and other information used by monitoring terms 202. In another embodiment, monitoring queries 402 turns on or off queries from a library of queries. Examples of inputs by monitoring queries 402 include terms or phrases, such as, "where can I find water, fuel, food, medical care, and/or shelter." In another embodiment, tags and at-mentions can also be entered such as "#nowater" and "@needshelter," In another embodiment, more targeted monitoring queries 402 may be used, such as, "looking for/found/seen John Doe." In another embodiment, monitoring queries 402 may be edited or revised in response to changing conditions, information or other factors that may necessitate updating the monitored terms 202. In yet another embodiment, editing monitoring queries 402 may deactivate the query.

As a result of monitoring queries 402 causes a monitoring terms list 202 to be stored. Social network monitoring engine 204 gathers data. In one embodiment, monitoring engine 204 receives data from social network data sources 410. Monitoring rules 408 may include formulae, rules, models, algorithms, artificial intelligence, fuzzy logic, decision trees, or other factors, such as those provided by monitoring terms 202. In a further embodiment, monitoring rules 408 provides linguistic modifications such that terms discovered in posts are discovered even if they word is not identical to the monitored term. For example, monitoring rules 408 may include a rule looking for issues of "water," the Spanish "agua," the term "thirsty" and/or any other word or phrase that may indicate a trend within the category of "water."

Third party data sources 412 may include governmental and non-governmental agencies, news organizations, charities, schools, individuals or other source of relevant information. In a further embodiment, third party public data sources 412 includes subscriber or fee-based sources such as satellite image providers and private weather forecasting or other services provided by private enterprises.

Social network monitoring engine 204 then passes an indicium of an answer to answer analysis 216. As described more fully with respect to FIG. 3, answer analysis 216 determines if, when and to whom a message is to be sent. In another embodiment, and as also described more fully described with respect to FIG. 3, answer analysis 216 may provide and/or receive CRM data, such as by CRM 306. An automated and/or human agent then causes response out 322 to send a response message to the selected parties and via the selected channel (e.g., social media site, website, email, voice call, text message, et cetera). In another embodiment, response out 322 may cause a record in a database to be created or updated, the reordering of records, or other indicator of the trend and/or trust level either alone or within context of at least one other record and/or message.

Figure 5:
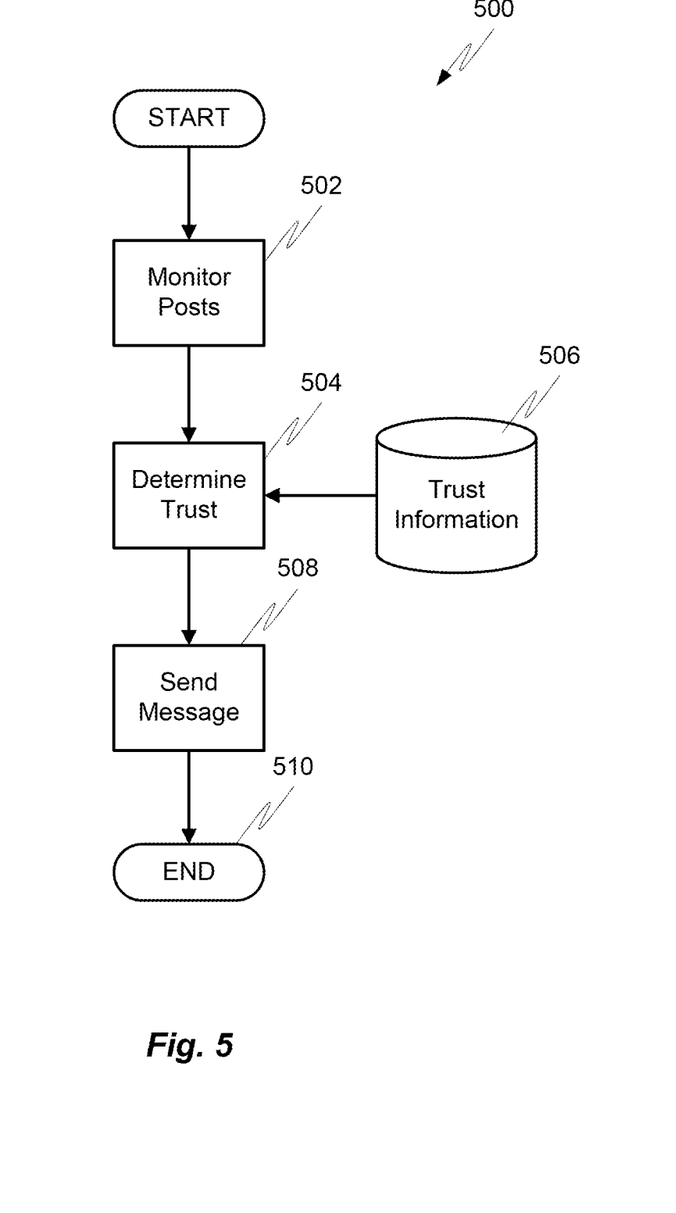
FIG. 5 is a flow chart of a message generation process in accord with embodiments of the present disclosure.

FIG. 5 is a flow chart of message generation process 500 in accord with embodiments of the present disclosure. In one embodiment, processor 104 executing monitoring engine 204 performs step 502, whereby posts are monitored on a number of sites, including social media network sites and/or third party websites. Processor 104 may then perform step 504 and determine a trust value in accord with trust information 506 and cause message dissemination 108 to perform step 508 and send a message in accord with the post and the trust information. Optionally, step 508 may be a notification, such as creating or updating a record in a database, and/or the sending of a message, including but not limited to, posting on a social media website, updating an RSS feed, sending a text message, sending an email, generating an automatic voice message, causing a human agent to deliver a voice message or other communication means.

In another embodiment, step 502 monitors posts from a number of sources and/or posters. In one embodiment, posts are gathered from posters without regard to any screening factors. In another embodiment, only posts from screened posters are gathered. In still another embodiment, posts not associated with a particular term or set of terms are discarded and not processed any further.

Step 504 determines a trust factor associated with a post and/or poster. In one embodiment, trust is determined from the source, poster and/or terms within the post. Trust information 506 may be a public or private database, a historical record, key attributes, and/or other aspect to determine trust. In one embodiment, the source is a factor of trust. For example, a governmental agency, such as the Federal Emergency Management Agency ("FEMA") may be given a higher degree of trust as compared to a television news channel's RSS feed or a social media site. Similarly, certain non-governmental agencies, such as the International Red Cross may be given a trust value higher than other sources.

In another embodiment, the poster is a factor in determining trust. As an example, a poster on a social media website is known to be a physician by trust information 506. While many posts on a social media website from this poster address a subject not associated with an emergency situation, such as a hobby, a post from this poster that does address a medical and/or emergency situation may be afforded a greater degree of trust. In a further embodiment, a physician may be given a higher level of trust, even in with respect to non-medical subject matter, as compared to the general population simply because a physician is generally regarded as a credible member of the community. As one example of a more-trusted, but non-medical, post would be a physician posting that a river has overflowed its banks during a heavy rain.

In another embodiment, trust is associated with the number of posts and posters. In one example, a single post regarding an unusual event may warrant no action. However, if a great number of posts, especially if the post are from a large number of individual and/or unassociated posters, are discussing the unusually event, an action may be warranted. Such a trust may be further bolstered by geo-location services. For example, if posts are coming from posters known to be in a common area, the trust associated with location-specific posts may be higher than if the posters are not known to be within the common area.

Trust information 506 may be initially set to a default value or pre-populated with trust information. As communication system 100 continues to operate, and trustworthiness observed, the trust value associated with one or more posters may be modified up or down accordingly. Trust information 506 may also be set based on a particular source or category of sources.

Step 508 sends a message. In one embodiment, a minimum threshold value of a message is first determined. The threshold may be one of subject matter, such as posts dealing with irrelevant matters may be ignored. In another embodiment, the severity of the subject matter is evaluated. For example, rain showers are of little concern but a downpour may require action. In a further embodiment, the recipient may be considered. In one example, those involved in certain activities may care greatly about a small rain shower and, therefore, desire messages informing them of such events, even if the majority of the population considers such notifications trivial.

In one embodiment, a trust indicator is associated with a message. A trust indicator may be an assimilation of one or more factors and provided to the recipient of the message. For example, in a disaster situation, step 502 monitors post associated with locating drinking water. Step 504 evaluates a number of posts and evaluates the trust with thrust information 506. Step 508 sends one or more messages notifying recipients where they may be able to find drinking water. The trust indicator is variously embodied and may be a value on a numeric range, color coded, letter graded, or other indicator. To continue the example, two messages are created. One message is, "Drink water available at the Main Street fire station. Trust=High" and "Drinking water available at the Oak Street police station. Trust=2." A key to the trust may be provided with the message (e.g., "Trust=2 [1=low, 10=high]") or at another resource, such as a website.

In another embodiment, a trust indicator is associated with the message within a context. A most trusted message may be placed in one location, such as the top of a list. The list may then be ordered in terms of trust indictor.

As a benefit, those receiving the message may make their own decision based on the message and trust factor. Continuing the example, the low-trust message (e.g., identifying the Oak Street police station as a source of drinking water) may be discounted by someone needing a greater degree of certainty. However, individuals, such as those close to the location referenced by the low-trust message or those unable to access the location referenced by the high-trust message, may weight their options and consider the low-trust message a viable option given their particular circumstances.

In another embodiment, the recipient and/or destination of the message are determined. In one embodiment, one or more of the posting source may be a destination for a posting of the answer message. In other embodiments, subscribers are the recipient of the message. In another embodiment, a voice message is created and made available, such as by a recorded message, interactive voice response, or outbound message or live operator call.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for performance by an electronic device, comprising:
    monitoring, by a processor, a social media network that receives a post from a data source;
    determining, by the processor, that the post satisfied a criterion or set of criteria;
    upon determining that the post satisfies the criterion or set of criteria, determining, by the processor, a trust factor associated with a source of the post, the subject matter of the post, and the poster of the post; and
    creating a notification in accord with the post and the trust factor.

2. The method of claim 1, wherein creating the notification further comprises creating the notification incorporating the trust factor.

3. The method of claim 1, wherein the criterion or set of criteria is associated with an emergency state.

4. The method of claim 1, wherein the source includes at least one of (i) a social media web site, (ii) an RSS feed on a web site, and (iii) geo-data.

5. The method of claim 1, wherein:
    the monitoring of the social media network operable to receive the post from the data source, further comprises, monitoring a plurality of posting services operable to receive a plurality of posts from a number of sources;
    the determining that the post satisfies a criterion, further comprises, determining that the plurality of posts satisfies the criterion; and
    the disseminating of the message in accord with the post and the trust factor, further comprises, disseminating the message that is a summary of the plurality of posts and a summary of the trust factor associated with the number of sources.

6. The method of claim 1, wherein disseminating the message, further comprises, at least one of (i) sending an email, (ii) posting a tweet on Twitter, (iii) posting a message on a website, (iv) posting a message on an RSS feed, (v) sending a voice message, and (vi) posting on a web log.

7. The method of claim 1, wherein the criterion further comprises a criteria with a number of additional criterion, a first additional criterion being a term indicative of an emergency condition.

8. The method of claim 7, further comprising, a second additional criterion associated with, at least one of (a) the volume of posts and (b) a trend in the volume of posts, and is further associated with language substantially equivalent to the term.

9. A computer system for sending a message, comprising:
a monitor, that monitors a social media website for a post;
a processor, that obtains trust information associated with a poster of the post on the social media website;
wherein the processor, further (a) determines that the post satisfies a criterion, (b) determines that the poster has a trust associated with the criterion and in accord with the subject matter of the post and (c) formats a message in accord with (a) and (b); and
a reply interface, that sends the message to a destination.

10. The computer system of claim 9, further comprising, the monitor being further operable to monitor the social media website for a number of posts.

11. The computer system of claim 10, wherein the processor is further operable to (a) determine that a plurality of the number of posts satisfies a criterion and (b) determine ones of a number of posters of the number of posts has a trust associated with the criterion.

12. The computer system of claim 9, wherein the reply interface is further operable to post the message on at least one of the social media website and a different social media website.

13. The computer system of claim 9, further comprising, the processor being further operable to update the trust associated with the criterion.

14. The computer system of claim 13, further comprising, the processor being further operable to update the trust associated with the criterion based on a second source of trust information.

15. A method for performance by an electronic device, comprising:
determining, by a processor, a trend in posts by a number of posters on a number of sources;
determining, by a processor, a trust level associated with the number of posters and in accord with the subject matter of the post;
determining, by the processor, a method to provide the trend to a recipient;
determining, by the processor, the recipient; and
communicating, by the processor, the trend to the recipient in accord with the method.

16. The method of claim 15, whereby communicating, further comprises, communicating the trend and the trust level.

17. The method of claim 15, whereby determining the recipient of the message, further comprises, determining the recipient indicated a desire to receive messages associated with the trend.

18. The method of claim 15, further comprising, excluding the trend from being communicated to the recipient upon determining a prior trend was communicated having, at least one of, a similar subject matter, a higher priority and within a time threshold.

* * * * *